United States Patent [19]

Shiozawa et al.

[11] Patent Number: 4,479,133
[45] Date of Patent: Oct. 23, 1984

[54] LIGHT BEAM ROTARY PRINTER

[75] Inventors: Etuo Shiozawa; Masahiro Ohnishi; Shigeo Harada, all of Asaka, Japan

[73] Assignee: Fuji Photo Film Co., Ltd., Saitama, Japan

[21] Appl. No.: 355,874

[22] Filed: Mar. 8, 1982

[30] Foreign Application Priority Data

Mar. 16, 1981 [JP] Japan .................................. 56-37457

[51] Int. Cl.³ ............................................ G01D 15/14
[52] U.S. Cl. .................................... 346/108; 346/134; 358/292
[58] Field of Search ..................... 346/108, 76 L, 134; 358/292, 302

[56] References Cited

U.S. PATENT DOCUMENTS 3,925,790 12/1975 Fischbeck ........................... 346/140
3,958,250 5/1976 Rolon ............................... 346/108 X
4,030,122 6/1977 Chemelli ......................... 346/76 1 X Primary Examiner—Joseph W. Hartary
Attorney, Agent, or Firm—Gerald J. Ferguson, Jr.; Joseph J. Baker

[57] ABSTRACT

A light beam projecting system comprising a light source and a condenser lens system is mounted on a rotator to project radially outwardly a light beam modulated by a desired modulating signal representing information to be recorded while rotating together with the rotator. The rotator is mounted for movement in the direction parallel to the rotational axis thereof whereby the light beam emitted from the light beam projecting system is caused to scan a recording medium opposed to the peripheral surface of the rotator to record the information thereon.

7 Claims, 5 Drawing Figures

LIGHT BEAM ROTARY PRINTER

BACKGROUND OF THE INVENTION

1. Field of the Invention

This invention relates to a printer for recording information on a recording medium using a light beam such as a laser beam modulated by a signal representing the information to be recorded, and more particularly to a light beam rotary printer for recording information using a light beam emitted from a light source mounted on a rotator.

2. Description of the Prior Art

Lasers can emit light beams having a high spatial coherence and high spectral line brightness difficult to obtain with other light sources and therefore are used in many optical recording devices and reading devices. As optical recording devices using such laser beams, there have been known those which employ a galvanometer mirror or a rotating multifaceted mirror to deflect a laser beam modulated by a signal representing information to be recorded to two-dimensionally scan a recording medium. However, those recording devices are disadvantageous in that the manufacturing cost thereof is high since expensive elements such as a rotating mirror and an $f\theta$ lens are required, and that the recording cannot be effected with a high resolution and a high brightness since the laser beam cannot be highly concentrated due to the long optical path, between the condenser lens system in the laser beam projecting system and the recording medium, which is inherent to the recording device of the above structure. There has been proposed a printer employing a drum type platen which is rotated with a recording medium placed on the peripheral surface thereof, and a laser beam projecting system disposed near the platen in order to reduce the optical distance between the condenser lens system and the recording medium. In such a recording device, the main scanning is effected by rotating the platen and the sub scanning is effected by reciprocating the laser beam projecting system. However, this device is disadvantageous in that the platen must be large in order to support a recording medium of a practical size and is difficult to rotate a large platen at a high speed to obtain a high recording speed.

SUMMARY OF THE INVENTION

In view of the foregoing observations and description, the primary object of the present invention is to provide a light beam rotary printer which can effect recording with a high resolution and a high brightness at a high recording speed.

In accordance with the present invention, a light beam projecting system comprising a light source and a condenser lens system is mounted on a rotator to project a light beam radially outwardly and a recording medium is positioned opposed to the peripheral surface of the rotator. The rotator is mounted for movement in the direction parallel to the rotational axis thereof, whereby the light beam emitted from the light source is caused to two-dimensionally scan the recording medium opposed to the peripheral surface of the rotator. The light source is modulated by a driving current representing information to be recorded.

In the rotary printer in accordance with the present invention in which the recording medium is stationary while the light source is rotated, a high recording speed can be obtained since the light beam projecting system can be sufficiently small in size and accordingly the rotator carrying the light beam projecting system can be of light weight and small size, whereby the rotator can be rotated at a high speed. Furthermore, the recording medium can be positioned near the light beam projecting system to increase the resolution and the brightness of the recording.

As the light source, there can be used a semiconductor laser as well as a light emitting diode which is of light weight, can be directly modulated, and can emit a light beam having a high brightness and characteristics such as convergency, similar to a laser beam.

In a preferred embodiment of the present invention, a plurality of light beam projecting sections are provided on the rotator so that the recording medium is always subjected to scanning by one of the sections. This further increases the recording speed. Further, the recording speed can be more increased by forming each light beam projecting section with a plurality of light beam projecting systems to project a plurality of light beams the optical axes of which are slightly offset from each other, thereby scanning the recording medium along a plurality of scanning lines simultaneously.

DESCRIPTION OF THE PREFERRED EMBODIMENT

Figure 1:
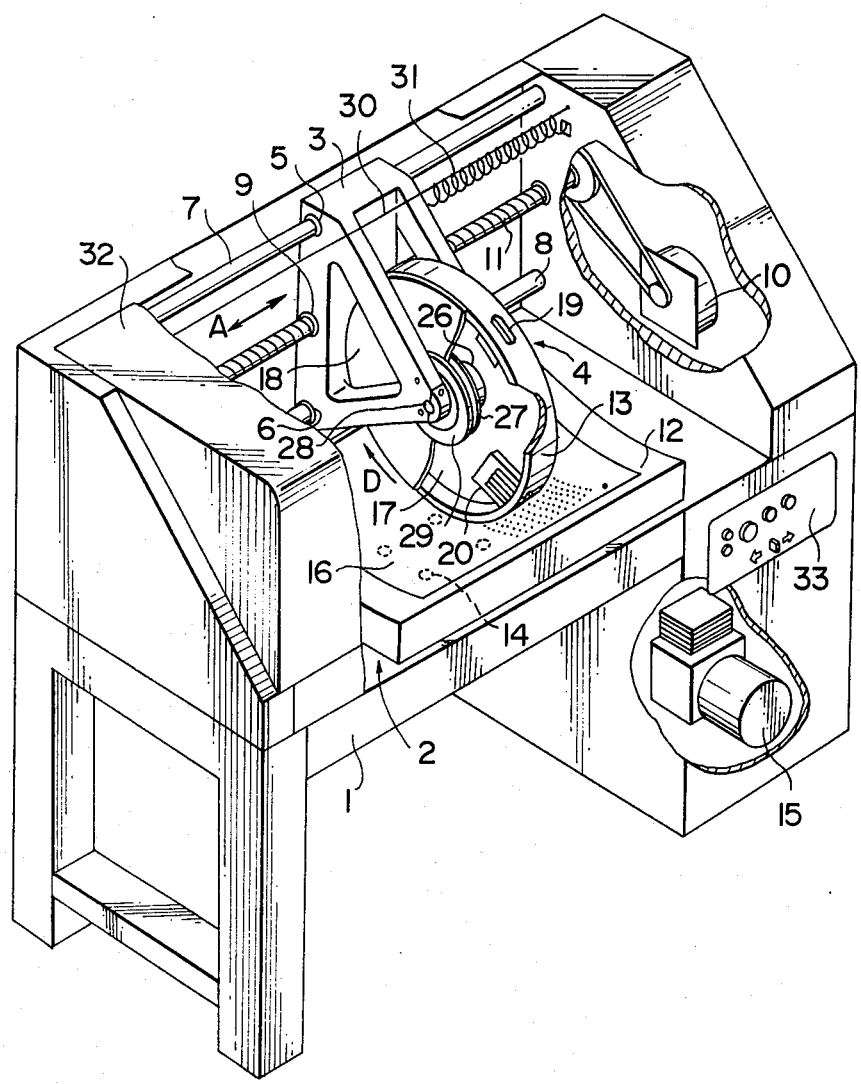
FIG. 1 is a partly broken away perspective view of a rotary printer in accordance with an embodiment of the present invention.

Now referring to FIGS. 1 to 5 a light beam rotary printer in accordance with an embodiment of the present invention includes a platen 2 mounted on a frame 1 and a rotary disk 4 supported by an arm 3 over the platen 2. The arm 3 has a pair of bearings 5 and 6 on the back side thereof which slidably receive a pair of parallel rods 7 and 8 fixed to the frame 1. The arm 3 is thus supported for sliding movement along the rods 7 and 8 in the directions shown by an arrow A in FIG. 1. A nut 9 is secured to the arm 3 between the bearings 5 and 6 and is engaged with a lead screw 11 which is driven by an arm driving motor 10. When the motor 10 is energized to rotate the lead screw 11, the arm 3 is moved along the rods 7 and 8.

Figure 2:
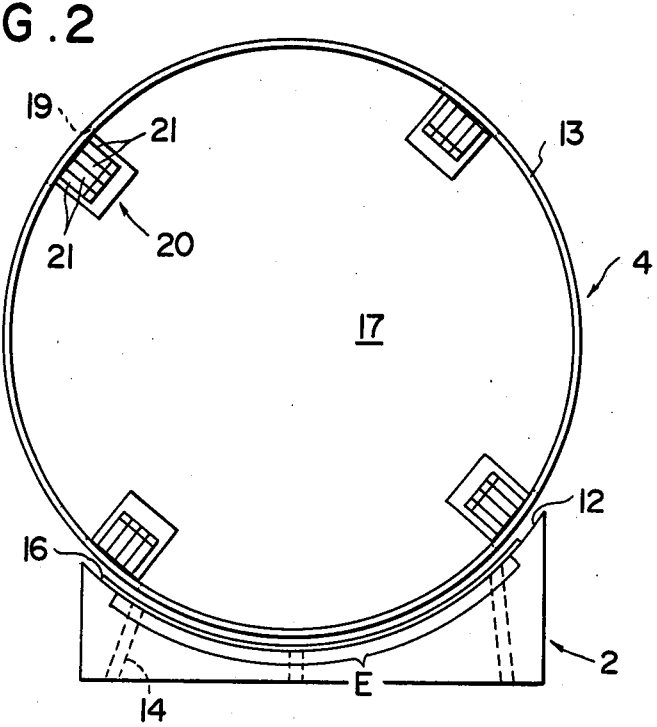
FIG. 2 is an enlarged side elevational view of a part of the printer shown in FIG. 1.

As clearly shown in FIG. 2, the platen 2 has an arcuate upper surface facing the peripheral surface of the rotary disk 4 and forming a recording medium supporting surface 12. The recording medium supporting surface 12 is positioned with respect to the peripheral surface 13 of the rotary disk 4 so that the center of curvature of the recording medium supporting surface 12 coincides with the central axis of the rotary disk 4. There are formed several suction holes 14 in the platen 2 which open in the recording medium supporting surface 12 and are connected to a vacuum pump 15 (FIG. 1) through a line (not shown). When the vacuum pump 15 is operated with a recording medium e.g., a recording paper 16, placed on the platen 2, the recording paper 16 is firmly held on the recording medium supporting surface 12 by means of a suction force provided through the suction holes 14. The recording paper 16 may be replaced by any other suitable recording material.

Figure 3:
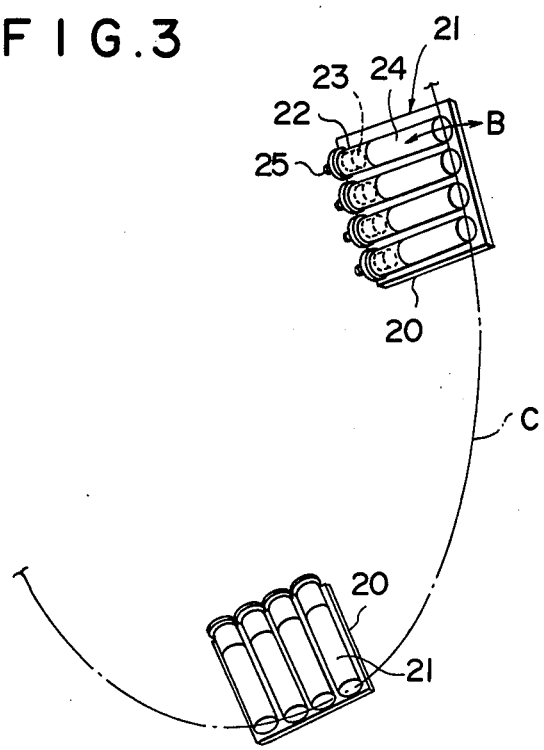
FIG. 3 is a schematic view showing a part of the printer shown in FIG. 1.

The rotary disk 4 comprises a cylindrical body portion having the peripheral surface 13 and a closed end face 17, and a lid member 18 covering the open end of the body portion. On the peripheral surface 13 of the rotary disk 4 are formed four elongated windows 19 which are equally spaced from each other in the peripheral direction. Four laser beam projecting sections 20 are fixed to the closed end face 17 within the rotary disk 4, each section 20 being directed to one of the windows 19 to project laser beams radially outwardly through the window. As is schematically shown in FIG. 3, each laser beam projecting section includes four laser beam projecting systems 21 which are mounted so that the mechanical central axes thereof are on a plane perpendicular to the central axis of the rotary disk 4. The four laser beam projecting sections 20 are equivalent to each other in their properties and the centers of the sixteen laser beam projecting systems 21 are all positioned on a common circle. Each laser beam projecting system 21 comprises a semiconductor laser 23 and a condenser lens system 24 held in a cylindrical holder 22.

Figure 4:
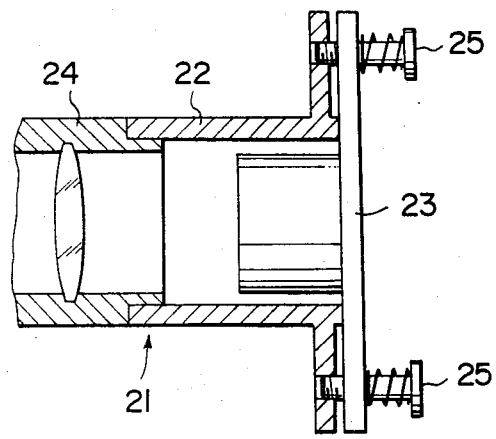
FIG. 4 is an enlarged cross sectional view of a light beam projecting system employed in the printer.
Figure 5:
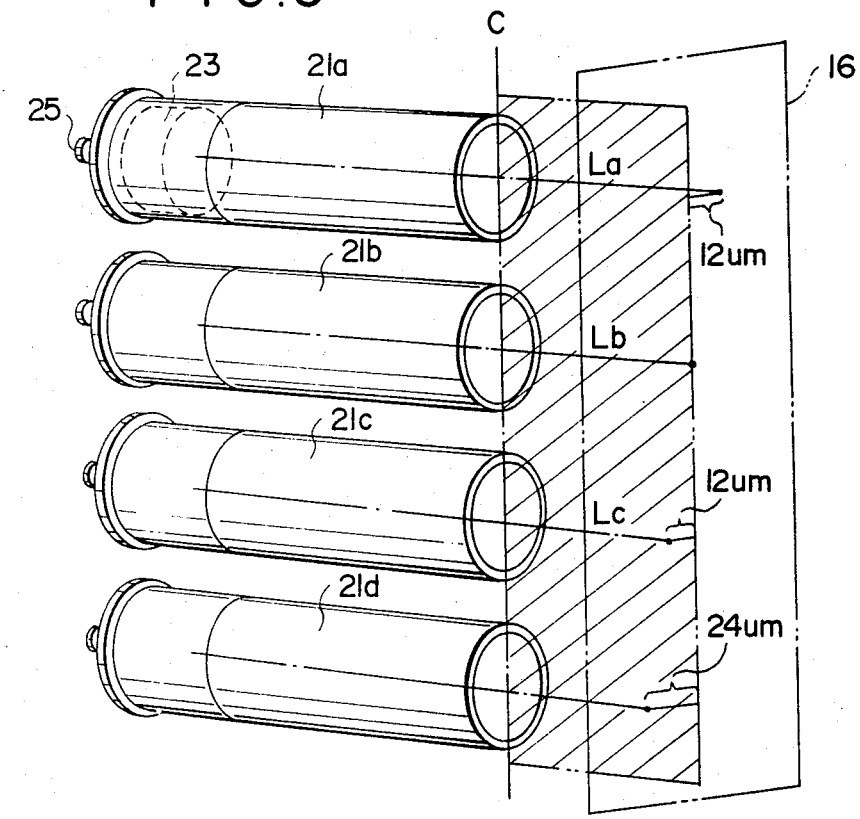
FIG. 5 is an enlarged perspective view showing the arrangement of four light beam projecting systems employed in each light beam projecting section of the printer.

As shown in FIG. 4, each laser 23 is mounted on its holder 22 by means of a pair of fine adjustment screws 25 so that the optical axis of each laser 23 can be swung in the directions of an arrow B in FIG. 3 independently from the other lasers. In each laser beam projecting section 20 the optical axes of the four laser beam projecting systems 21 are adjusted to be offset from each other. More particularly, the first to fourth systems 21a to 21d are adjusted so that the optical axis Lb of the second system 21b is aligned with the mechanical center C thereof, the optical axis La of the first system 21a is offset from the mechanical center C to the right in the direction of the arrow A in FIG. 1 by a distance of $12\mu$, the optical axis Lc of the third system 21c is offset from the mechanical center C to the left in the direction of the arrow A by a distance of $12\mu$, and the optical axis Ld of the fourth system 21d is offset from the mechanical center C to the left by a distance of $24\mu$, the amounts of offset all being as measured on the recording paper 16 as shown in FIG. 5. Thus, the four laser beams emitted from each laser beam projecting section 20 will impinge on the recording paper 16 at four positions spaced from each other by $12\mu$.

The rotary disk 4 is rotated in the direction shown by an arrow D in FIG. 1 by means of an outer-rotor motor 26 fixed around the central axis thereof. A printed secondary winding 27 is fixed to the inner surface of the lid member 18 and a printed primary winding 29 is fixed to the inner surface of a bearing portion 28 of the arm 3 which rotatably supports the rotary disk 4. A high frequency current modulated by a signal representing information to be recorded is supplied to the primary winding 29 through a cable 31 and is transmitted to the rotary disk 4 by way of the electromagnetic connection between the primary and secondary windings 29 and 27 to drive the semiconductor lasers 23. Alternatively, the electric current for driving the semiconductor lasers 23 may be supplied to the rotary disk 4 by way of a slip ring and a brush. However, the electromagnetic connection is preferable since it does not generate noises which would adversely influence other nearby electric circuits. The outer-rotor motor 26 for driving the rotary disk 4 is also supplied with an electric current through the cable 31. The starting point of rotation of the rotary disk 4 is detected by a rotary encoder (not shown) fixed to the rotary disk 4 and a detecting section (not shown) fixed to the arm 3. The space within which the rotary disk 4 is moved is covered by a cover 32. Preferably, the cover 32 is made of material which transmits visible light insensible for the recording paper 16 so that operation of the device can be viewed from the outside.

The rotary printer of this embodiment is used together with an information feeding device connected thereto by way of an electric cord and is operated using various controls on a panel 33. The rotary disk 4 is initially positioned above the right edge portion of the recording paper 16. When a signal representing information to be recorded is supplied to the printer and the printer is turned on, the rotary disk 4 is rotated in the direction of the arrow D in FIG. 1 by means of the outer-rotor motor 26. At the same time the arm 3 supporting the rotary disk 4 is moved leftward by the motor 10 and the lead screen 11. The rotary disk 4 is thus moved along the recording paper 16 while rotating. Accordingly, the laser beams projected through the windows 19 two-dimensionally scan the recording paper 16, the rotating direction of the rotary disk 4 being the main scanning direction and the direction parallel to the rotational axis of the rotary disk 4 being the sub scanning direction. As described above, the optical axes of the four laser beam projecting systems 21 in each projecting section 20 are offset from each other in the direction of the sliding movement of the rotary disk 4 by $12\mu$. Therefore, the recording paper 16 is scanned along four scanning lines with a scanning width of $12\mu$ each time one of the four laser beam projecting sections 20 goes across the recording paper 16. As shown in FIG. 2, the four projecting sections 20 are arranged so that immediately after one projecting section is moved across the recording area E on the recording paper 16 by rotating the rotary disk 4 by 90°, another projecting section comes above the recording area E to begin scanning. Further, the arm 3 is translated by $48\mu$ ($12\mu \times 4$) for each 90° of rotation of the rotary disk 4. Thus, the scanning width between the scanning lines is always maintained at $12\mu$. The semiconductor laser 23 emitting the laser beam for scanning the recording paper 16 is driven by a driving current modulated by a modulating signal input from the information feeding device, whereby the information represented by the modulating signal is recorded on the recording paper 16 which is sensitive to the laser beam. Each time the recording of information is completed, the arm 3 carrying the rotary disk 4 is returned to the initial position.

As can be seen from the above description, in the light beam rotary printer of this embodiment, the recording paper 16 is two-dimensionally scanned by rotating and laterally translating the rotary disk 4 carrying the semiconductor lasers 23 which are of light weight and compact in size, whereby the rotary disk 4 can be rotated at a high speed to greatly increase the recording speed. Further, in the rotary printer of this embodiment, the four laser beam projecting systems 21 in each laser beam projecting sections 20 are mechanically aligned with each other in the direction of the rotation of the rotary disk 4 and are arranged so that the optical axes of thereof can be offset from each other by adjusting the fine adjustment screws 25. Therefore, the scanning width can be reduced to as small as 12μ, whereby high density recording can be effected.

We claim:

1. A light beam rotary printer comprising a rotator rotatable about the central axis thereof and carrying at least one light projecting section for outwardly projecting a light beam, a driving means for rotating the rotator about the central axis, a power supplying means for supplying power modulated by a desired modulating signal, a platen for supporting a recording medium opposed to the peripheral surface of the rotator to be exposed to the light beam projected by at least one light projecting section while the rotator is rotated and means for translating the rotator along the central axis and wherein each of said light beam projecting sections includes a plurality of light beam projecting systems each of which comprises a light source and a condenser lens system, the light beam projecting system being mounted so that the mechanical centers of all the light beam projecting systems in all the light beam projecting sections are positioned on a common circle in a plane perpendicular to the central axis of the rotator having its center on the central axis, and the optical axes of the light beam projecting systems in each light beam projecting section are arranged to intersect the recording medium on the platen at positions offset from each other in the direction of the central axis of the rotator.

2. A light beam rotary printer as defined in claim 1 wherein said light beam projecting section comprises a light source and a condenser lens system for concentrating the light beam emitted from the light source.

3. A light beam rotary printer as defined in claim 2 wherein said light source is a semiconductor laser.

4. A light beam rotary printer as defined in claim 1 wherein said light source is a light emitting diode.

5. A light beam rotary printer as defined in claim 2 wherein said rotator carries a plurality of said light beam projecting sections equally spaced along the peripheral surface of the rotator.

6. A light beam rotary printer as defined in claim 1 wherein said power supplying means comprises a fixed primary winding which is supplied with a high frequency current modulated by the desired modulating signal, and a secondary winding fixed to the rotator in electromagnetic connection with the primary winding to recieve the high frequency current therefrom in a non-contact fashion.

7. A light beam rotary printer comprising a rotator rotatable about the central axis thereof and carrying at least one light projecting section for outwardly projecting a light beam, a driving means for rotating the rotator about the central axis, a power supplying means for supplying power modulated by a desired modulating signal, and a platen for supporting a recording medium opposed to the peripheral surface of the rotator to be exposed to the light beam projected by at least one light projecting section while the rotator is rotated, said light beam projecting section comprising a light source and a condenser lens system for concentrating the light beam emitted from the light source, said rotator carrying a plurality of said light beam projecting sections equally spaced along the peripheral surface of the rotator, each of said light beam projecting sections includes a plurality of light beam projecting systems each of which comprises said light source and said conmdenser lens system, the light beam projecting systems being mounted so that the mechanical centers of all the light beam projecting systems in all the light beam projecting sections are positioned on a common circle in a plane perpendicular to the central axis of the rotator having its center on the central axis, and the optical axes of the light beam projecting systems in each light beam projecting section are arranged to intersect the recording medium on the platen at positions offset from each other in the direction of the central axis of the rotator.

* * * * *